United States Patent
Xu et al.

(10) Patent No.: US 11,014,267 B2
(45) Date of Patent: May 25, 2021

(54) CO-ROTATING SELF-CLEANING TWO-SCREW EXTRUDER WITH A GRADUAL NUMBER OF THREADS AND THROUGH SELF-CLEANING FUNCTION, AND A PROCESSING METHOD USING THE SAME

(71) Applicant: Guangdong Industry Polytechnic, Guangzhou (CN)

(72) Inventors: Baiping Xu, Guangzhou (CN); Huiwen Yu, Guangzhou (CN); Liang He, Guangzhou (CN); Jinwei Chen, Guangzhou (CN); Wenliu Zhuang, Guangzhou (CN); Meigui Wang, Guangzhou (CN)

(73) Assignee: GUANGDONG INDUSTRY POLYTECHNIC, Guangdong (CN)

( * ) Notice: Subject to any disclaimer, the term of this patent is extended or adjusted under 35 U.S.C. 154(b) by 369 days.

(21) Appl. No.: 15/746,880

(22) PCT Filed: Mar. 17, 2016

(86) PCT No.: PCT/CN2016/076553
§ 371 (c)(1),
(2) Date: Jan. 23, 2018

(87) PCT Pub. No.: WO2017/016227
PCT Pub. Date: Feb. 2, 2017

(65) Prior Publication Data
US 2020/0023554 A1    Jan. 23, 2020

(30) Foreign Application Priority Data
Jul. 24, 2015   (CN) .......................... 201510442207.9

(51) Int. Cl.
*B29B 7/48* (2006.01)
*B29C 48/535* (2019.01)
(Continued)

(52) U.S. Cl.
CPC .............. *B29B 7/482* (2013.01); *B29B 7/489* (2013.01); *B29C 48/40* (2019.02); *B29C 48/402* (2019.02);
(Continued)

(58) Field of Classification Search
CPC ....................................................... B29B 7/48
(Continued)

(56) References Cited

U.S. PATENT DOCUMENTS 3,122,356 A * 2/1964 Erdmenger ............. B29C 48/57
366/85
9,724,844 B1 * 8/2017 Kowalczyk ............. B29B 7/482
(Continued)

FOREIGN PATENT DOCUMENTS

CN    201784159 U    4/2011
CN    102058011 A    5/2011
(Continued)

OTHER PUBLICATIONS

1. International Search Report dated Jun. 20, 2016, Application No. PCT/CN2016/076553.

*Primary Examiner* — David L Sorkin
(74) *Attorney, Agent, or Firm* — The Dobrusin Law Firm, P.C.

(57) ABSTRACT

A co-rotating self-cleaning two-screw extruder with a gradual number of threads and through self-cleaning function, and a processing method using the same, are disclosed. The screw assembly in the extruder includes a first screw (3) and a second screw (4) that co-rotate at the same speed in engagement; the first screw (3) includes a first single
(Continued)

threaded element, a first transition element, a multiple threaded element, a second transition element and a second single threaded element that are connected in sequence; and the second screw (4) includes a first single threaded element, a third transition element, a multiple threaded element, a fourth transition element and a second single threaded element that are connected in sequence. The materials are transferred by rotation of the first (3) and second screws (4), and get their respective compositions mixed based on the structure of a gradual number of threads; with the flow passage expanded, contracted and re-expanded in shape in sequence, the materials undergo the single-to-multiple threaded, multiple-to-single threaded and again single-to-multiple threaded chaotic mixing in sequence; and the first and second screws achieve the self-cleaning effect by wiping each other.

9 Claims, 7 Drawing Sheets

(51) Int. Cl.
*B29C 48/68* (2019.01)
*B29C 48/40* (2019.01)
*B29C 48/405* (2019.01)
*B29C 48/54* (2019.01)
*B29C 48/57* (2019.01)
*B29C 48/76* (2019.01)

(52) U.S. Cl.
CPC .......... *B29C 48/405* (2019.02); *B29C 48/535* (2019.02); *B29C 48/54* (2019.02); *B29C 48/57* (2019.02); *B29C 48/682* (2019.02); *B29C 48/767* (2019.02)

(58) Field of Classification Search
USPC .................................................. 366/85, 301
See application file for complete search history.

(56) References Cited

U.S. PATENT DOCUMENTS

2011/0112255 A1 5/2011 Bierdel
2011/0160381 A1 6/2011 König et al.

FOREIGN PATENT DOCUMENTS

| CN | 203141815 U | 8/2013 |
| CN | 104527025 A | 4/2015 |
| CN | 105058743 A | 11/2015 |

\* cited by examiner

CO-ROTATING SELF-CLEANING TWO-SCREW EXTRUDER WITH A GRADUAL NUMBER OF THREADS AND THROUGH SELF-CLEANING FUNCTION, AND A PROCESSING METHOD USING THE SAME

FIELD OF THE INVENTION

The present invention relates to the field of the two-screw extruder technology, especially to a co-rotating self-cleaning two-screw extruder with a gradual number of threads and through self-cleaning function, and a processing method using the same.

BACKGROUND OF THE INVENTION

A co-rotating two-screw extruder with the self-cleaning function is nowadays a widely used mixing processing device. Such a device mainly includes a barrel and two screws mounted in parallel in a barrel chamber of the barrel. In order to produce high-shearing enhanced mixing, a multiple threaded structure is mostly used in the traditional practice, which leads to several independent flow passages into which the materials are separated while they are transferred forward; for example, a double threaded screw may divide the flow passage in the barrel into three flow passages not in communication with each other, which makes the materials move forward along the respective flow passages during the transmission without mixing. In this way, nonuniform division of the feed composition may cause that the materials entering different flow passages have nonuniform composition; this situation cannot be improved by mixing the materials with each other while they are moving forward, and is thus usually a key factor leading to unstable product quality. Only in a zone provided with a kneading block can the materials be mixed with each other, but the kneading block may result in problems such as high-friction heat and a sudden surge in the motor current caused by gap deformation at a high rotational speed, as well as high shearing, material accumulation, dead space and the reduced self-cleaning effect. On the other hand, determined by the geometric engaging relation, a multiple threaded screw may also cause the spiral groove to become shallow and reduce the production. A traditional co-rotating two-screw extruder provides disturbance only in the engaging zone to improve the mixing quality, but lacks the chaotic mixing enhance mechanism in a zone far away from the engaging zone. Besides, the materials have the consistent volume in the left and right spiral grooves, which cannot introduce the elongation force field, cutting distribution and other action mechanisms; the main part of the spiral groove capacity lacks the structure effectively improving the mixing effect, disenabling the distributive mixing effect to be further improved, and lacks the elongation force field effect, resulting in the nonideal dispersive mixing effect. Moreover, the processing course of the two-screw extruder is mostly in a non-filled state, and the almost unchanged flow passage makes the plasticating mixing effect of the materials greatly discounted; in order to improve the mixing effect and production, high shearing is achieved by the high rotational speed in the engineering practice; however, a big length-diameter ratio screw prolongs the processing course, which results in high energy consumption, low efficiency and material degradation, and many other issues.

CONTENTS OF THE INVENTION

In order to overcome the shortcomings of the prior art, a purpose of the present invention is to provide a co-rotating self-cleaning two-screw extruder with a gradual number of threads and through self-cleaning function, which combines the chaotic mixing, the elongation force field action and the cutting distributive mixing action and has the high melting-mixing efficiency.

Another purpose of the present invention is to provide a processing method using the above co-rotating self-cleaning two-screw extruder with a gradual number of threads and through self-cleaning function.

A technical solution of the present invention is as follows: A co-rotating self-cleaning two-screw extruder with a gradual number of threads and through self-cleaning function is provided, comprising a barrel and a screw assembly, the screw assembly being located in a barrel chamber of the barrel and including a first screw and a second screw that co-rotate at the same speed and keep engaged; the first screw includes a first single threaded element, a first transition element, a multiple threaded element, a second transition element and a second single threaded element that are connected in sequence; and the second screw correspondingly includes a first single threaded element, a third transition element, a multiple threaded element, a fourth transition element and a second single threaded element that are connected in sequence. That is, the first and second screws both have the cyclic structure of "a single threaded section—a single-to-multiple threaded transition section—a multiple threaded section—a multiple-to-single threaded transition section—a single threaded section", and the two screws always keep engaged to achieve the self-cleaning effect; by changing the structure of the flow passage, the screw of this structure can produce the "single to multiple threaded—multiple to single threaded—again single to multiple threaded" cyclic chaotic mixing action, thus improving the melting-mixing effect and mixing efficiency of the materials.

The first single threaded element is the same as the second single threaded element in structure, the first transition element and the second transition element are symmetric in structure, and the third transition element and the fourth transition element are symmetric in structure.

The first and second screws, both tangent to the inner wall of the barrel chamber, form a flow passage together with the barrel chamber; the barrel chamber is composed of two cylindrical grooves in communication with each other, with the barrel chamber having a cross section in the shape of a horizontal "8", the first and second screws being located correspondingly in the two cylindrical grooves.

The cross sections of the first and second screws are both composed of multiple arcs with different radius of curvature, and include the same number of arcs in the same axial position.

The cross sections of the first and second screws are both composed of 4-8 arcs.

The multiple threaded element may be a double threaded element, a triple threaded element or a quadruple threaded element.

The first and third transition elements, paired in use, are two single-to-multiple threaded transition elements with different structure, and the second and fourth transition elements, paired in use, are two multiple-to-single threaded transition elements with different structure.

The barrel is provided with a conveying section, a melting section, an venting section and a mixing-extruding section, which are arranged in sequence in the direction of movement of the materials being processed; the conveying section is provided with a feed inlet in communication with the barrel chamber, the venting section is provided with a gas outlet in communication with the barrel chamber, and the mixing-extruding section is provided at the end with a feed outlet; the melting section is mainly provided inside with the multiple threaded element, so is the mixing-extruding section. Wherein the first and second screws both include two sections of the structure of "a single threaded section—a single-to-multiple threaded section—a multiple threaded section—a multiple-to-single threaded section—a single threaded section", the conveying section, the venting section and the mixing-extruding section are all provided at the end with the "single threaded" structure, and the melting section and the mixing-extruding section are mainly provided with the "multiple threaded" structure.

A processing method using the above co-rotating self-cleaning two-screw extruder with a gradual number of threads and through self-cleaning function is mainly as follows: The materials, while moving in the flow passage, are transferred by rotation of the first and second screws, and meanwhile get their respective compositions mixed based on the structure of a gradual number of threads; with the flow passage is expanded, contracted and re-expanded in shape in sequence, the materials undergo single-to-multiple threaded, multiple-to-single threaded, and again single-to-multiple threaded chaotic mixing in sequence; while the materials are transferred, the first and second screws always keep engaged, and achieve the self-cleaning effect by wiping each other.

Wherein the materials have the following specific processes while they are going through various stages in the barrel:

(1) After the materials enter the flow passage of the conveying section from the feed inlet, the first and second screws co-rotate at the same speed around the respective screw axis; the materials are transferred under the common action of the axial positive displacement conveying force of the first and second screws and the friction between the first and second screws, and meanwhile get their respective compositions mixed based on the structure of a gradual number of threads, thus eliminating the quality instability resulted from feed composition fluctuation and forcing the materials to move toward the flow passage of the melting section;

(2) when the materials move to the flow passage of the melting section, with the continuous change of the number of threads of the first and second screws, cutting-dispersing, converging, and again cutting-dispersing, and random billowing effects are produced in the flow passage, and the first and second screws generate frictional heat at a high rotational speed that, together with the external heat of the barrel, further melts the materials; because the flow passages of the first and second screws are both characterized by the "single-to-multiple threaded, multiple-to-single threaded, and again single-to-multiple threaded" chaotic mixing at the same time, and the cross section of the flow passage is "expanded, contracted and re-expanded" in shape, separation of the molten materials from the solid materials is accelerated; besides, random change is introduced into the engaging zone of the flow passages of the first and second screws, which will further enhance the chaotic mixing effect and further accelerate the melting progress of the solid materials to get the materials molten;

(3) after the molten materials enter the flow passage of the venting section from the flow passage of the melting section, with the single threaded structure of large lead used in the venting section, there is sudden expansion in the volume of the flow passage, which expands the surface area of the materials for venting gas and accelerates discharge of gas from the gas outlet, with the molten materials further moving to the flow passage of the mixing-extruding section under the action of the first and second screws;

(4) the molten materials, after entering the flow passage of the mixing-extruding section, are subject to the "cutting-dispersing, converging, and again cutting-dispersing" action and also the "single-to-multiple threaded, multiple-to-single threaded, and again single-to-multiple threaded" chaotic mixing action of the first and second screws, and the first and second screws introduce the random disturbance action into the engaging zone to enhance chaotic mixing throughout the spiral groove, which mixes and plasticates the molten materials and makes the molten materials extruded stably out of the feed outlet; meanwhile, the first and second screws achieve the self-cleaning effect by wiping each other.

The present invention has the following beneficial effects compared to the prior art:

1. In the screw assembly of the present invention, the first and second screws both have the structure of "a single threaded section—a single-to-multiple threaded transition section—a multiple threaded section—a multiple-to-single threaded transition section—a single threaded section" cycled in sequence, and the two screws rotate at the same speed in engagement, which can effectively solve the problem of unstable product quality resulted from the raw material composition fluctuation, guarantee both the powerful transfer efficiency and the exhaust efficiency of the single threaded deep spiral groove, improve the solid transfer efficiency, and increase the extruding production to a greater extent, applicable to large-yield processing.

2. In the present invention, the single threaded element and the multiple threaded element are connected by the threaded structure with a gradual number of threads, which can produce cutting-dispersing, converging, and again cutting-dispersing, and random billowing effects in the flow passage, and enhance the melting process and dispersive mixing effectively, making the kneading block possible to be cancelled. Therefore, the present invention fully enhances the mixing and heat transfer process, and significantly shortens the thermal and mechanical courses for plasticating, achieving a remarkable energy saving effect.

3. The present invention guarantees co-rotating in close engagement of the first and second screws, with the two screws wiping each other to achieve the self-cleaning effect in the processing course.

4. The present invention introduces the composite structure with a gradual number of threads, which is particularly applicable to the non-filled extruding process and may cancel the kneading block, significantly improving the self-cleaning effect of the processing course, making the retention period of the processing course distributed more narrowly, improving the processing efficiency and effect, particularly applicable to processing high-yield nanomaterials.

DETAILED DESCRIPTION OF THE EMBODIMENTS

The present invention will be further described below in detail with reference to examples; however, the embodiments of the present invention are not limited thereto.

EXAMPLE 1

Figure 1:
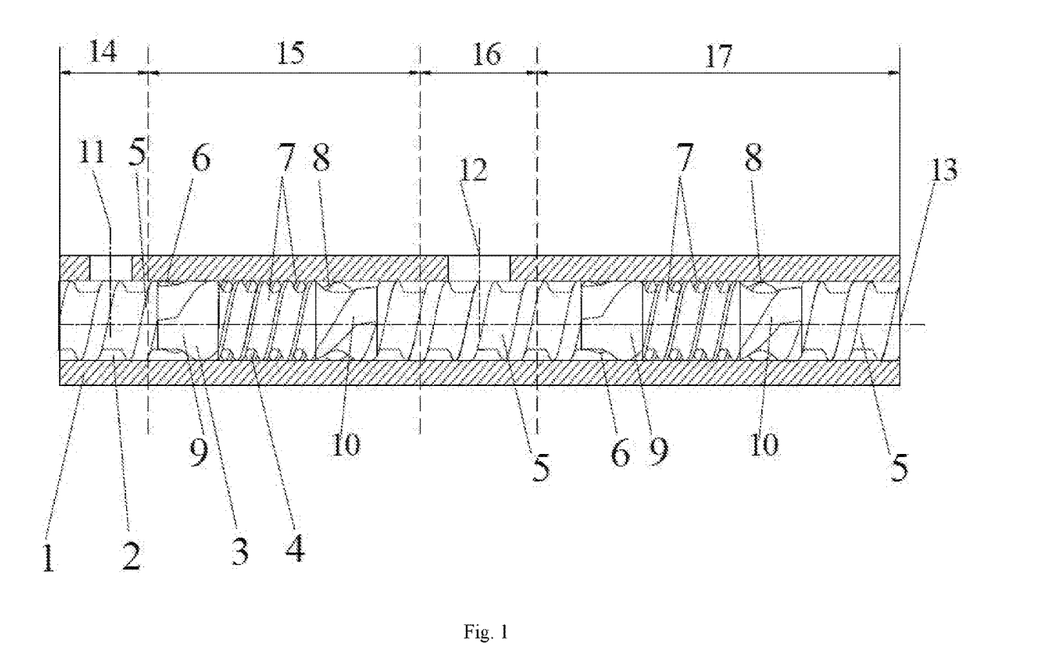
FIG. 1 is a schematic diagram of the structure of the co-rotating self-cleaning two-screw extruder with a gradual number of threads and through self-cleaning function in Example 1.
Figure 2:
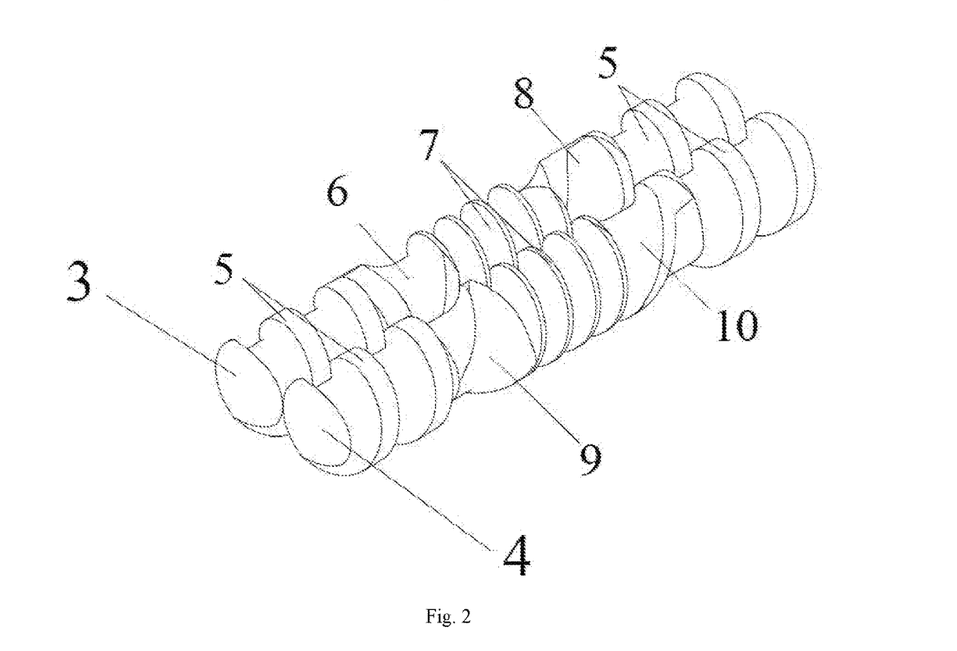
FIG. 2 is a three-dimensional schematic diagram of a part of the screw in FIG. 1.

This example provides a co-rotating self-cleaning two-screw extruder with a gradual number of threads and through self-cleaning function, whose structure is as shown in FIGS. 1-7, comprising a barrel 1 and a screw assembly, inside the barrel being a barrel chamber 2 where the screw assembly is located; the screw assembly includes a first screw 3 and a second screw 4 (as shown in FIG. 2), which engage with each other and are both tangent to the inner wall of the barrel chamber; the first and second screws form a flow passage together with the barrel chamber; the cross sections of the first screw 3 and the second screw 4 are both composed of 4-8 arcs with different radius of curvature; and the first screw is composed of various threaded elements including a single threaded element 5, a first single-to-double threaded transition element 6, a double threaded element 7, and a first double-to-single threaded transition element 8, and uses the combined connection form of "the single threaded element (used as the first single threaded element), the first single-to-double threaded transition element (used as the first transition element), the double threaded element, the double-to-single threaded transition element (used as the second transition element), and the single threaded element (used as the second single threaded element, whose structure is the same as the first single threaded element)" cycled in sequence; the second screw is composed in the same way, i.e., it is composed of the single threaded element 5, the second single-to-double threaded transition element 9 (used as the third transition element), the double threaded element 7, the second double-to-single threaded transition element 10 (used as the fourth transition element), and the single threaded element 5, which are cycled in sequence; when the first screw 3 and the second screw 4 co-rotate at the same speed, they always keep in engagement with each other to achieve the self-cleaning effect. The barrel chamber 2 is composed of two cylindrical grooves in communication with each other, having a cross section in the shape of a horizontal "8".

Wherein the first and second screws both have the maximum outer diameter of D, and the minimum inner diameter of d. The distance between the rotating center $O_1$ of the first screw 3 and the rotation center $O_2$ of the second screw 4 is C, with $$\frac{\sqrt{2}D}{2} \leq C < D.$$

Figure 3:
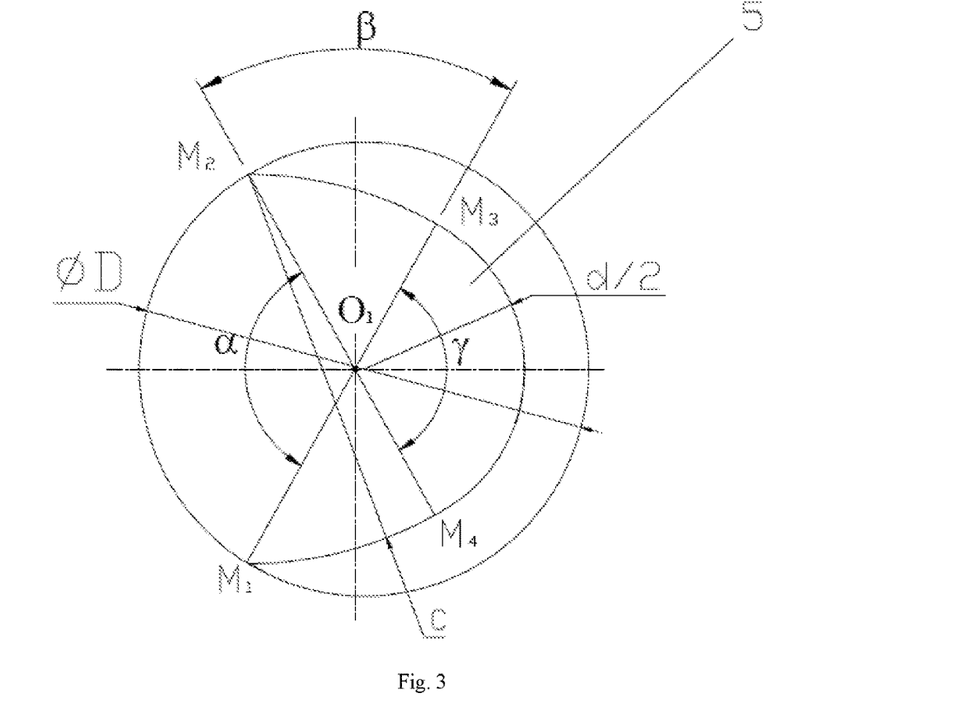
FIG. 3 is a schematic diagram of the cross-sectional structure of the single threaded element in a single screw.

As shown in FIG. 3, the cross section of the single threaded element 5 is composed of four arcs (i.e., $M_1M_2$, $M_2M_3$, $M_3M_4$ and $M_4M_1$); to be specific, the central angle of $M_2M_3$ and $M_4M_1$ is $\beta$, with $$\beta = 2\arccos\left(\frac{C}{D}\right),$$

and $M_2M_3$ and $M_4M_1$ are an arc having the radius of C; the central angle $\alpha$ to which $M_1M_2$ corresponds is a vertex angle, and the central angle $\gamma$ of $M_3M_4$ is a base angle; if the vertex angle $\alpha$ of the single threaded element is equal to the base angle $\gamma$, then $\alpha=\gamma=\pi-\beta$.

Figure 4:
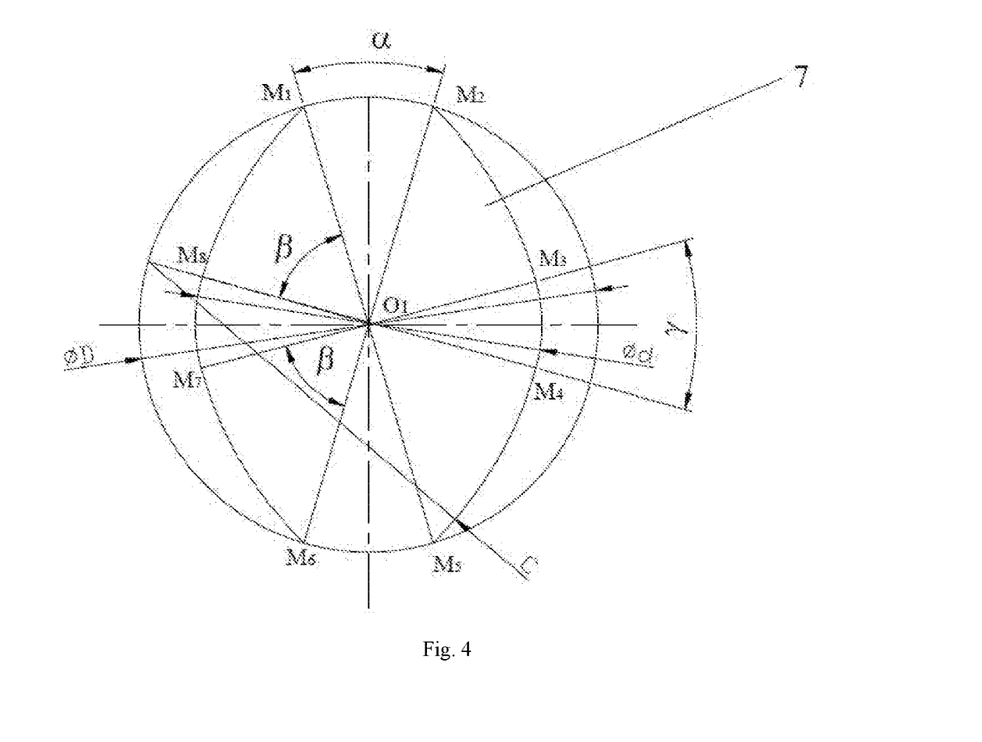
FIG. 4 is a schematic diagram of the cross-sectional structure of the double threaded element in a single screw.

As shown in FIG. 4, the cross section of the double threaded element 7 is composed of eight arcs (i.e., $M_1M_2$, $M_2M_3$, $M_3M_4$, $M_4M_5$, $M_5M_6$, $M_6M_7$, $M_7M_8$ and $M_8M_1$); to be specific, the central angle of $M_2M_3$, $M_4M_5$, $M_6M_7$ and $M_8M_1$ is $\beta$, with $$\beta = 2\arccos\left(\frac{C}{D}\right),$$

and $M_2M_3$, $M_4M_5$, $M_6M_7$ and $M_8M_1$ are an arc having the radius of C; the central angle $\alpha$ to which $M_1M_2$ and $M_5M_6$ correspond is a vertex angle, and the central angle $\gamma$ of $M_3M_4$ and $M_7M_8$ is a base angle; if the vertex angle $\alpha$ of the threaded element 7 is equal to the base angle $\gamma$, then $$\alpha = \gamma = \frac{\pi}{2} - \beta.$$

Figure 5:
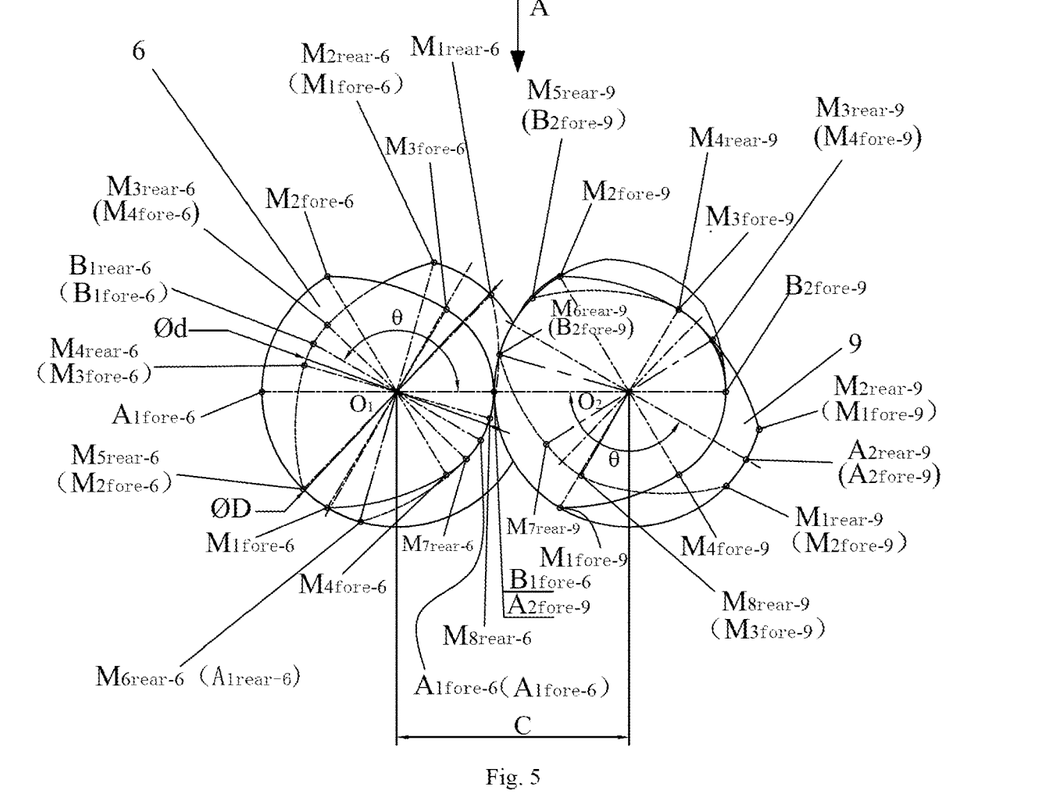
FIG. 5 is a schematic diagram of the cross-sectional structure of the single-to-double threaded transition element in the screw assembly.
Figure 6:
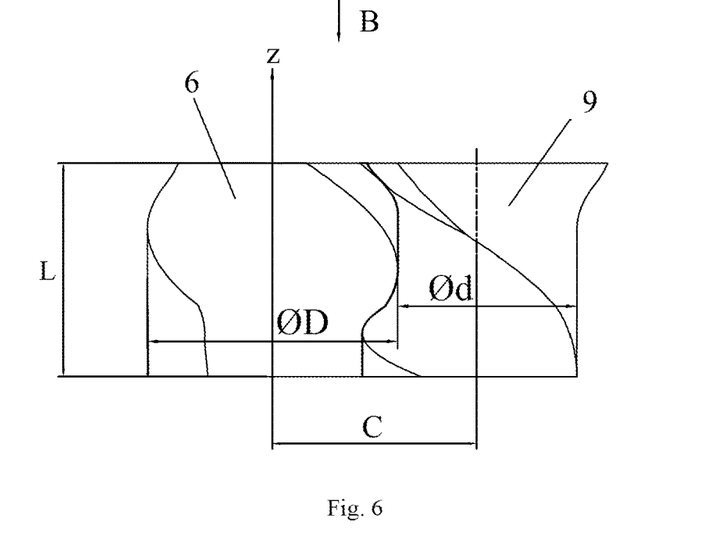
FIG. 6 is a diagram viewed in the direction of A in FIG. 5.
Figure 7:
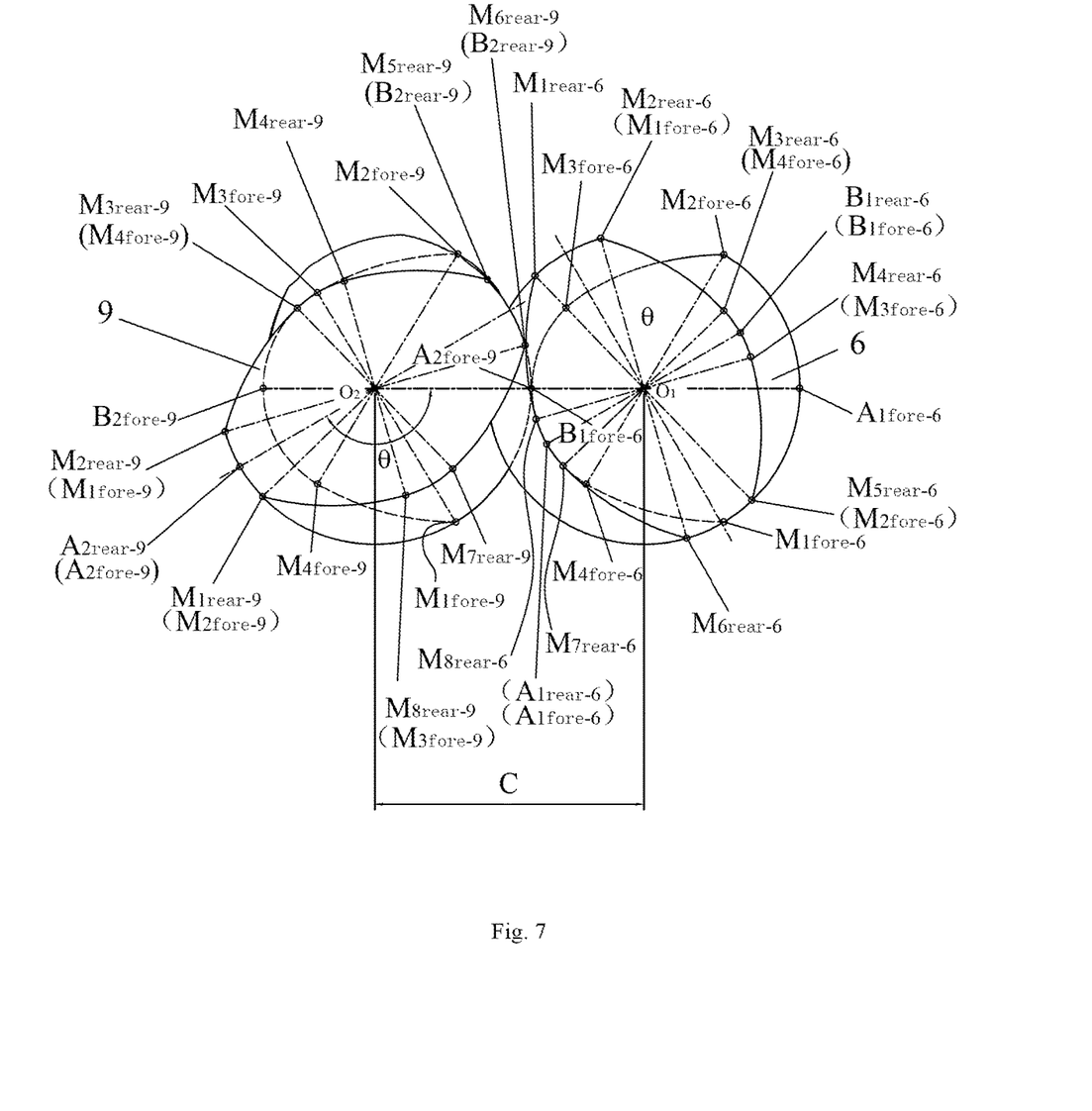
FIG. 7 is a diagram viewed in the direction of B in FIG. 6.
Figure 8:
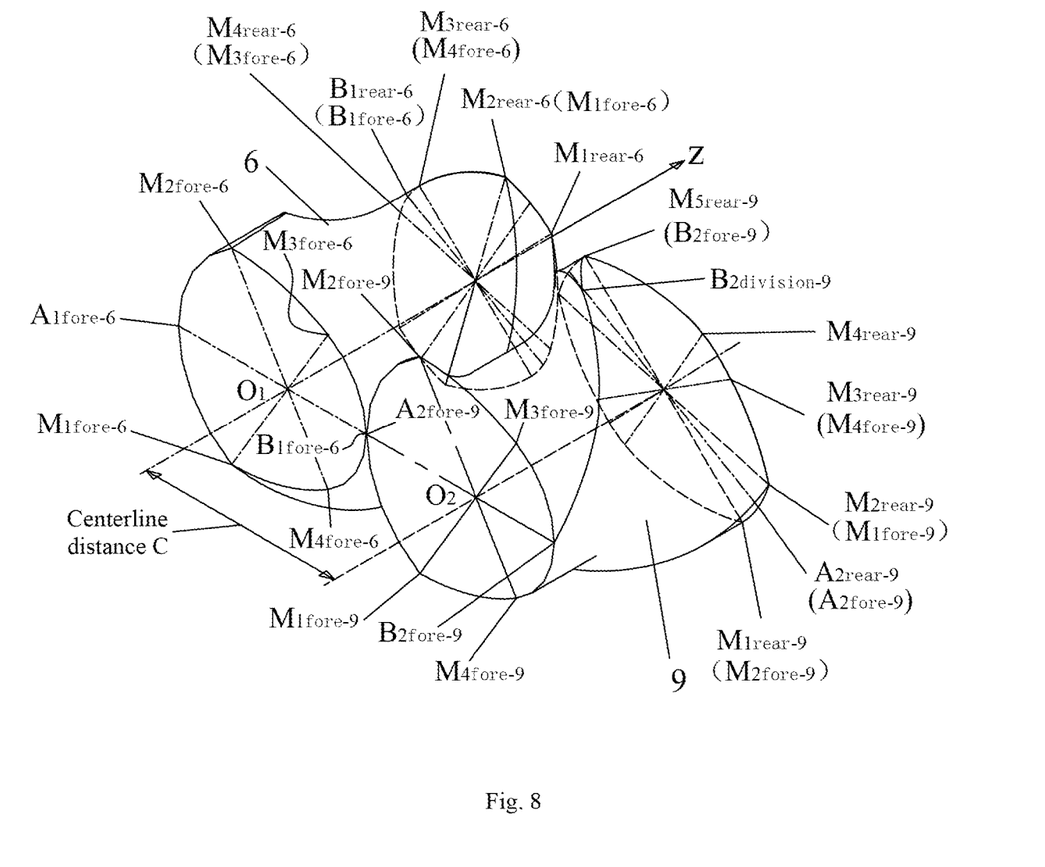
FIG. 8 is a three-dimensional schematic diagram of the single-to-double threaded transition element in the screw assembly in FIG. 2.
Figure 9:
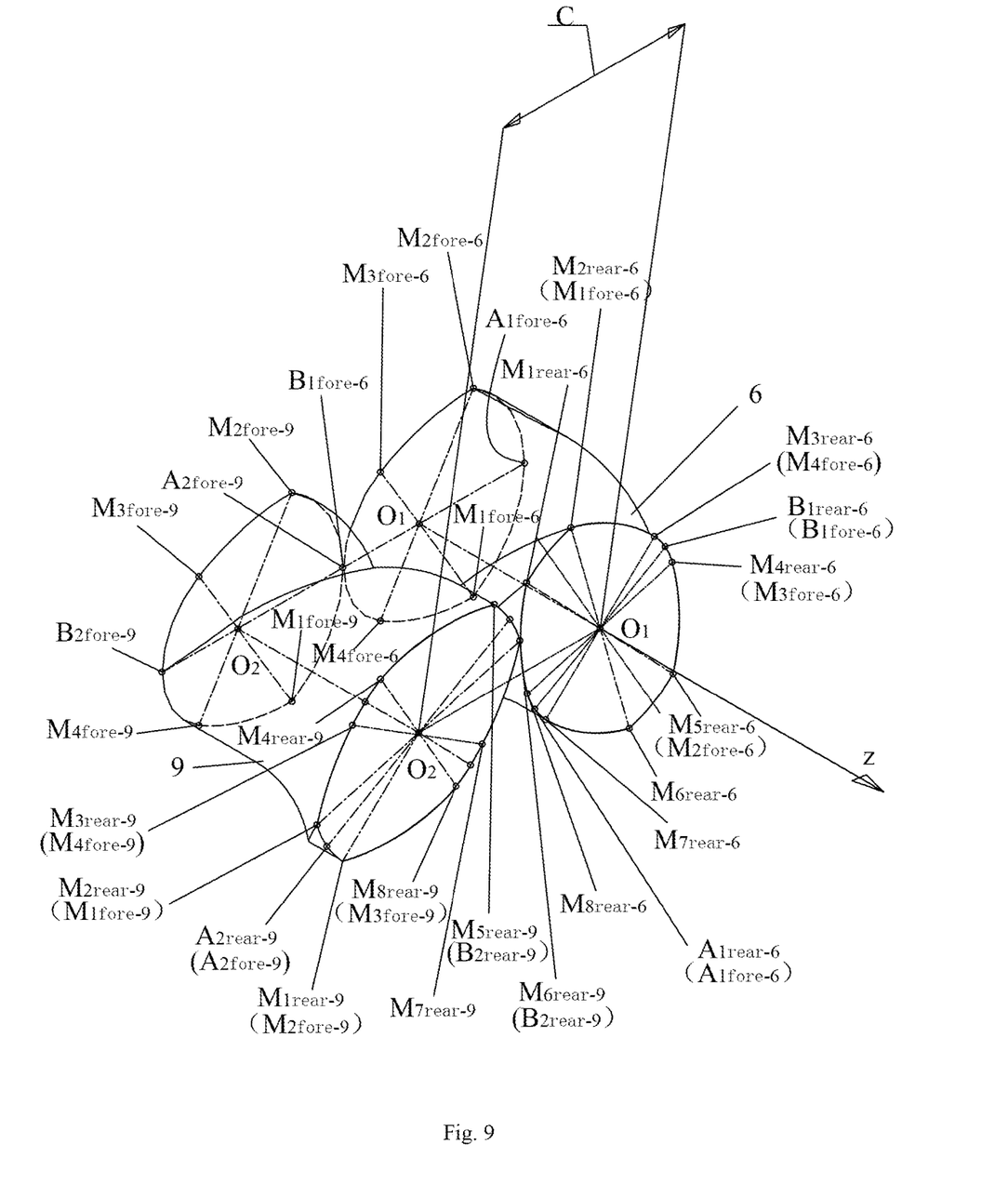
FIG. 9 is another three-dimensional schematic diagram of the single-to-double threaded transition element in the screw assembly in FIG. 2.

As shown in FIG. 5, 6, 7, 8 or 9, the first single-to-double threaded transition element 6 and the second single-to-double threaded transition element 9 are used in pairs, wherein the first single-to-double threaded transition element has the rotating center of $O_1$, the axial length of L, a single threaded head, and a screw axis in parallel with the z coordinate axis, with the origin of coordinate located at the head $O_1$ and the forward z coordinate axis oriented from the head of the threaded transition element to the tail. As shown in FIG. 5, the cross section of the head is composed of a top arc $M_{1fore-6}M_{2fore-6}$, flank arcs $M_{2fore-6}M_{3fore-6}$ and $M_{4fore-6}M_{1fore-6}$, and a root arc $M_{3fore-6}M_{4fore-6}$, wherein the top arc $M_{1fore-6}M_{2fore-6}$ is symmetric with respect to $O_1A_{1fore-6}$ and has the radius of D/2, the flank arcs $M_{2fore-6}M_{3fore-6}$ and $M_{4fore-6}M_{1fore-6}$ have the corresponding central angle $\beta$ of with $$\beta = 2\arccos\left(\frac{C}{D}\right)$$

and have the radius as the screw centerline distance C, and the root arc $M_{3fore-6}M_{4fore-6}$ is symmetric with respect to $O_1B_{1fore-6}$ and has the radius of d/2; for the first single-to-double threaded transition element in the single-to-double threaded continuous gradual changing process, $B_{1fore-6}$ is converted to $B_{1rear-6}$ (as shown in FIG. 8 or 9), with the radius of the curve where $B_{1fore-6}$ $B_{1rear-6}$ is located being d/2 and kept constant; while $A_{1fore-6}$ is converted to $A_{1rear-6}$ (as shown in FIG. 9), a groove is gradually formed, with the radius of the curve where $A_{1fore-6}$ $A_{1rear-6}$ is located gradually reduced from D/2 to d/2; $M_{1fore-6}$ is converted to $M_{2rear-6}$ (as shown in FIG. 9), $M_{2fore-6}$ is converted to $M_{5rear-6}$, $M_{3fore-6}$ is converted to $M_{4rear-6}$, and $M_{4fore-6}$ is converted to $M_{3rear-6}$, with the tail of the first single-to-double threaded transition element being double threaded, as shown in FIG. 7, wherein $M_{1rear-6}M_{2rear-6}$ and $M_{5rear-6}M_{6rear-6}$ are the top arc and have the radius of D/2; $M_{3rear-6}M_{4rear-6}$ and $M_{7rear-6}M_{8rear-6}$ are the root arc and have the radius of d/2, symmetric with respect to $O_1B_{1rear-6}M_{2rear-6}M_{3rear-6}$ and $M_{4rear-6}M_{5rear-6}$ are the flank arc, and have the corresponding central angle of β with $$\beta = 2\arccos\left(\frac{C}{D}\right),$$

with the radius as the screw centerline distance C. In the process of continuous change in shape of the cross section of the first single-to-double threaded transition element, the angle between $O_1B_{1fore-6}$ and $O_1B_{1rear-6}$ is θ with the value of 150°.

As shown in FIG. 5, the second single-to-double transition element 9 has the rotating center of $O_2$, the axial length of L, and a single threaded head, and is composed of a top arc $M_{1fore-9}M_{2fore-9}$, flank arcs $M_{2fore-9}M_{3fore-9}$ and $M_{4fore-9}M_{1fore-9}$, and a root arc $M_{3fore-9}M_{4fore-9}$, wherein the top arc $M_{1fore-9}M_{2fore-9}$ is symmetric with respect to $O_2A_{2fore-9}$ and has the radius of D/2, the flank arcs $M_{2fore-9}M_{3fore-9}$ and $M_{4fore-9}M_{1fore-9}$ have the corresponding central angle of β with $$\beta = 2\arccos\left(\frac{C}{D}\right)$$

and have the radius as the screw centerline distance C, and the root arc $M_{3fore-9}M_{4fore-9}$ is symmetric with respect to $O_2B_{2fore-9}$ and has the radius of d/2; as shown in FIG. 8, for the second single-to-double threaded transition element in the single-to-double threaded continuous gradual changing process, a single-spine protruding rib is formed by gradual protruding from $B_{2fore-9}$ to $B_{2division-9}$, the radius of the curve is increased gradually from d/2 to D/2, and the curve is separated into $M_{5rear-9}$ and $M_{6rear-9}$ after arriving at $B_{2division-9}$ (as shown in FIG. 9), with the radius D/2 kept constant; the radius of the curve where $B_{1rear-6}$ and $B_{1fore-66}$ $B_{1rear-6}$ are located is d/2 and kept constant; as shown in FIG. 8, $A_{2fore-9}$ is converted to $A_{2rear-9}$, with the radius of the curve where $A_{2fore-9}A_{2rear-9}$ is located being D/2 and kept constant; $M_{1fore-9}$ is converted to $M_{2rear-9}$, $M_{2fore-9}$ is converted to $M_{1rear-9}$, $M_{3fore-9}$ is converted to $M_{8rear-9}$, and $M_{4fore-9}$ is converted to $M_{3rear-9}$. The tail of the second single-to-double threaded transition element is double threaded, as shown in FIG. 7, wherein $M_{1rear-9}M_{2rear-9}$ and $M_{5rear-9}M_{6rear-9}$ are the top arc, and have the radius of D/2, symmetric with respect to $O_2A_{2rear-9}$, $M_{3rear-9}M_{4rear-9}$ and $M_{7rear-9}M_{8rear-9}$ are the root arc, and have the radius of d/2; $M_{2rear-9}M_{3rear-9}$, $M_{4rear-9}M_{5rear-9}$, $M_{6rear-9}M_{7rear-9}$ and $M_{7rear-9}M_{8rear-9}$ are the flank arc, have the corresponding central angle of β with $$\beta = 2\arccos\left(\frac{C}{D}\right),$$

and have the radius as the screw centerline distance C. In the process of continuous change in shape of the cross section of the second single-to-double threaded transition element, the angle between $O_2A_{2fore-9}$ and $O_2A_{2rear-9}$ is θ with the value of 150°.

Figure 10:
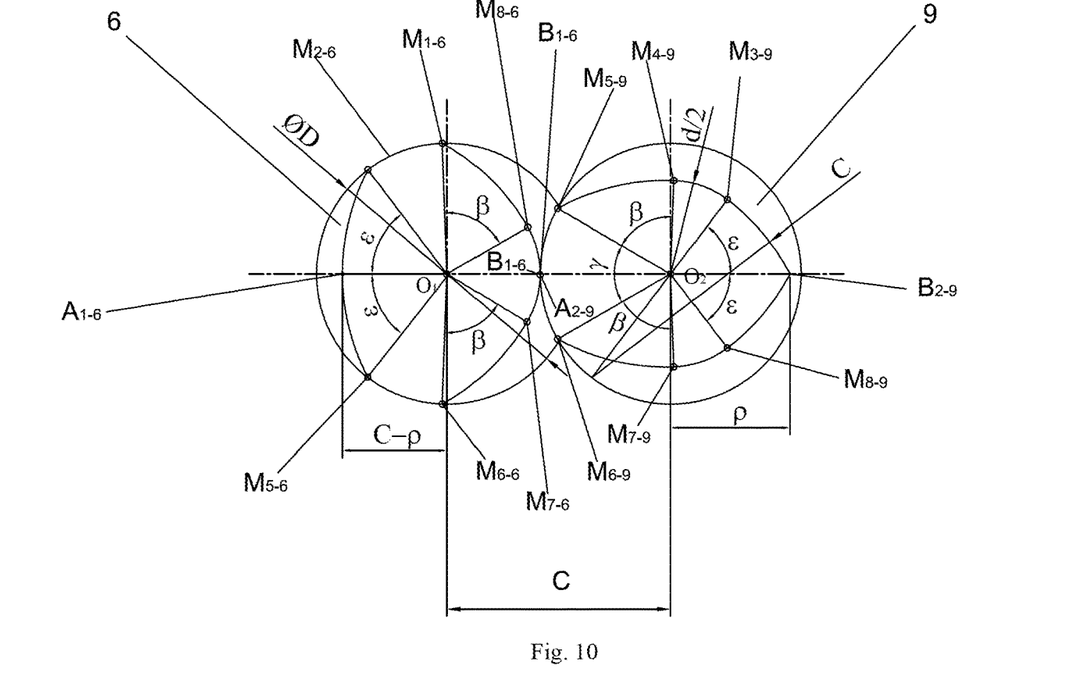
FIG. 10 is a schematic diagram of the cross-sectional structure of the single-to-double threaded transition element in FIG. 8 with the axial position in front of $B_{2division-9}$.
Figure 11:
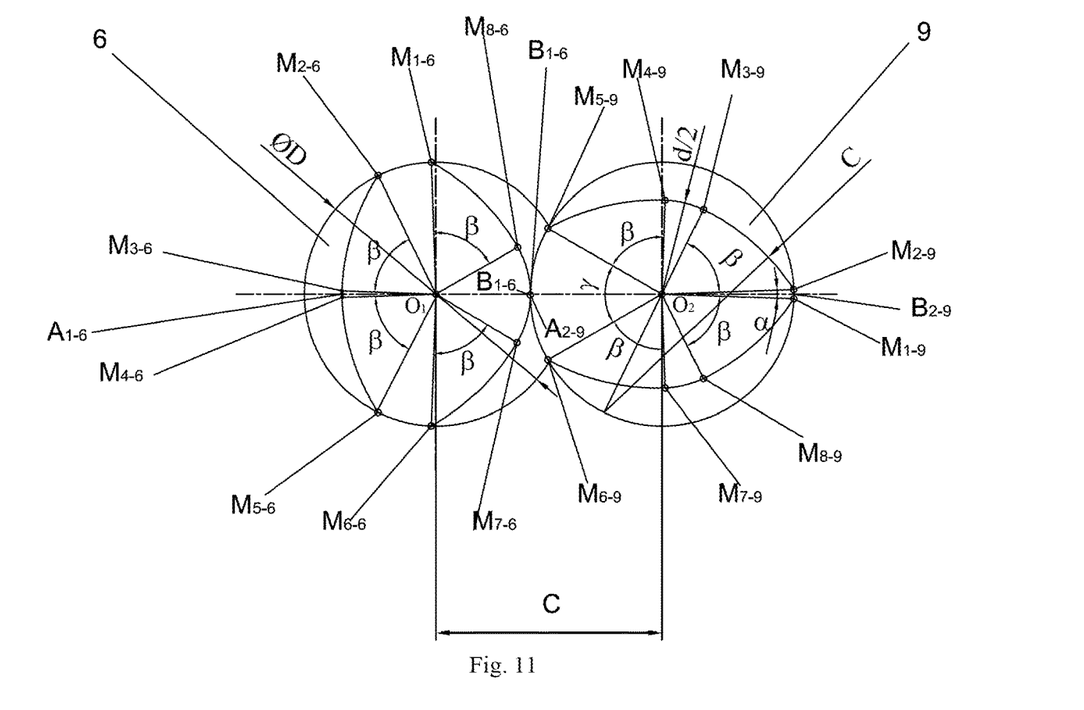
FIG. 11 is a schematic diagram of the cross-sectional structure of the single-to-double threaded transition element in FIG. 8 with the axial position at the rear of $B_{2division-9}$.

The first single-to-double threaded transition element and the second single-to-double threaded transition element have the same number of arcs on any cross section in the axial position, as shown in FIG. 10 or 11, and rotating the two screws by the same angle always makes $O_2A_{2-9}$ in the horizontal position.

When the axial position is in front of $B_{2division-9}$, the cross section of the screw assembly is as shown in FIG. 10, the first single-to-double threaded transition element is composed of seven arcs and symmetric with respect to $O_2A_{2-9}$, wherein $M_{7-6}M_{8-6}$ is the root arc and has the radius of d/2; wherein $\angle M_{7-6}O_1M_{8-6}=\gamma$, with γ gradually reduced with the axial z coordinate and $\pi/2-\beta \leq \gamma \leq \pi-\beta$; $M_{1-6}M_{2-6}$ and $M_{5-6}M_{6-6}$ are the top arc and have the radius of D/2, with the corresponding central angle of $\pi-\beta-\varepsilon-\gamma/2$; $M_{6-6}M_{7-6}$ and $M_{8-6}M_{1-6}$ are the flank arc and have the corresponding central angle of β, with the radius as the screw centerline distance C. The point $A_{1-6}$ is always located on the connecting line $O_1O_2$, with $O_1$ $A_{1-6}=C-\rho$, wherein ρ is the distance $O_2$ $B_{2-9}$ and is gradually increased with the z coordinate with $d/2 \leq \rho D/2$; $M_{2-6}A_{1-6}$ and $A_{1-6}M_{5-6}$ are the flank arc, have the radius as the screw centerline distance C, and have the corresponding central angle of ε, with $$\varepsilon = \pi - a\arccos\left(\frac{D^2+\rho^2-C^2}{2\rho D}\right).$$

The second single-to-double threaded transition element 9 is also composed of seven arcs and symmetric with respect to $O_2A_{2-9}$, wherein $M_{5-9}M_{6-9}$ is the top arc, and has the radius of D/2 and the corresponding central angle of γ that is gradually reduced with the axial z coordinate, with $\pi/2-\beta \leq \gamma \leq \pi-\beta$; $M_{3-9}M_{4-9}$ and $M_{7-9}M_{8-9}$ are the root arc, and have the radius of d/2 and the corresponding central angle of $\pi-\beta-\varepsilon-\gamma/2$; $M_{6-9}M_{7-9}$ and $M_{5-9}M_{4-9}$ are the flank arc and have the corresponding central angle of β, with the radius as the screw centerline distance C; the point $B_{2-9}$ is always located on the connecting line $O_1O_2$ with $O_2B_{2-9}=\rho$, wherein ρ is gradually increased with the z coordinate, with $d/2 \leq \rho \leq D/2$; $B_{2-9}$ $M_{3-9}$ and $M_{8-9}$ $B_{2-9}$ are the flank arc, and have the radius as the screw centerline distance C and the corresponding central angle ε, with $$\varepsilon = \pi - a\arccos\left(\frac{D^2+\rho^2-C^2}{2\rho D}\right).$$

When the axial position is at the rear of $B_{2division-9}$, the cross section of the screw assembly is as shown in FIG. 11, the first single-to-double threaded transition element is composed of eight arcs and symmetric with respect to $O_2A_{2-9}$, $M_{3-6}M_{4-6}$ and $M_{7-6}M_{8-6}$ are the root arc and have the radius of $d/2$; wherein $\angle M_{3-6}O_1M_{4-6}=\alpha$, with $\alpha$ gradually increased with the axial z coordinate and $0\leq\alpha\leq\pi/2-\beta$; wherein $\angle M_{7-6}O_1M_{8-6}=\gamma$, with $\gamma$ gradually reduced with the axial z coordinate and $\pi/2-\beta\leq\gamma\leq\pi-\beta$; $M_{2-6}M_{3-6}$, $M_{4-6}M_{5-6}$, $M_{6-6}M_{7-6}$ and $M_{8-6}M_{1-6}$ are the flank arc and have the corresponding central angle of $\beta$, with the radius as the screw centerline distance C; $M_{1-6}M_{2-6}$ and $M_{5-6}M_{6-6}$ are the top arc and have the radius of $D/2$, with the corresponding central angle of $\pi-2\beta-\alpha/2-\gamma/2$. The second single-to-double threaded transition element is also composed of eight arcs and symmetric with respect to $O_2A_{2-9}$, with $M_{1-9}M_{2-9}$ and $M_{5-9}M_{6-9}$ being the top arc and having the radius of $D/2$; wherein $\angle M_{1-9}O_2M_{2-9}=\alpha$, with $\alpha$ gradually increased with the axial z coordinate and $0\leq\alpha\leq\pi/2-\beta$; wherein $\angle M_{5-9}O_2M_{6-9}=\gamma$, with $\gamma$ gradually reduced with the axial z coordinate and $\pi/2-\beta\leq\gamma\leq\pi-\beta$; $M_{2-9}M_{3-9}$, $M_{4-9}M_{5-9}$, $M_{6-9}M_{7-9}$ and $M_{8-9}M_{1-9}$ are the flank arc and have the corresponding central angle of $\beta$, with the radius as the screw centerline distance C; $M_{3-9}M_{4-9}$ and $M_{7-9}M_{8-9}$ are the root arc, and have the radius of $d/2$ and the corresponding central angle of $\pi-2\beta-\alpha/2-\gamma/2$.

The first and second double-to-single threaded transition elements are used in pairs, and have their structure totally the same as the first and second single-to-double threaded transition elements, respectively, except for the head and the tail that are exchanged in mounting.

Meanwhile, the first screw 3 and the second screw 4 both have the pitch S of 0.01 D-10000 D, and the first and second single-to-double threaded transition elements, and the first and second double-to-single threaded transition elements all have the length L of 0.01 D-10000 D.

As shown in FIG. 1, the barrel 1 is provided with a conveying section 14, a melting section 15, an venting section 16 and a mixing-extruding section 17, which are arranged in sequence in the direction of movement of the materials being processed; the conveying section 14 is provided above with a feed inlet 11 in communication with the barrel chamber 2, the venting section 16 is provided above with a gas outlet 12 in communication with the barrel chamber, and the mixing-extruding section 17 is provided at the end with a feed outlet 13.

A processing method using the above co-rotating self-cleaning two-screw extruder with a gradual number of threads and through self-cleaning function specifically comprises the following steps:

(1) After the materials enter the flow passage of the conveying section 14 from the feed inlet 11, the first screw 3 and the second screw 4 co-rotate at the same speed around the respective screw axis; the materials are transferred under the common action of the axial positive displacement conveying force of the first and second screws and the friction between the first and second screws, and meanwhile get the compositions between the two screws mixed based on the gradual number of threads, thus eliminating the quality instability resulted from feed composition fluctuation and forcing the materials to move toward the flow passage of the melting section 15;

(2) when the materials move to the flow passage of the melting section 15, with the continuous change of the number of threads of the first and second screws, cutting-dispersing, converging, and again cutting-dispersing, and random billowing effects are produced in the flow passage, and the first and second screws generate frictional heat at a high rotational speed that, together with the external heat of the barrel, further melts the materials; because the flow passages of the first and second screws are both characterized by the "single-to-multiple threaded—multiple-to-single threaded—again single-to-multiple threaded" chaotic mixing at the same time, and the cross section of the flow passage is "expanded—contracted—expanded" in shape, separation of the molten materials from the solid materials is accelerated; besides, random change is introduced into the engaging zone of the flow passage of the two screws, which will further enhance the chaotic mixing effect and further accelerate the melting progress of the solid materials to get the materials molten;

(3) after the molten materials enter the flow passage of the venting section 16 from the flow passage of the melting section 15, with the single threaded structure of large lead used in the venting section, there is sudden expansion in the volume of the flow passage, which expands the surface area of the materials for venting gas and thus accelerates discharge of gas from the gas outlet 12, with the molten materials further moving to the flow passage of the mixing-extruding section 17 under the action of the two screws;

(4) the molten materials, after entering the flow passage of the mixing-extruding section 17, are subject to the "cutting-dispersing-converging-again cutting-dispersing" action and the "single-to-multiple threaded-multiple-to-single threaded-again single-to-multiple threaded" chaotic mixing action resulted from the flow passage of the screw, and the two screws introduce the random disturbance action into the engaging zone to enhance chaotic mixing throughout the spiral groove, which mixes and plasticates the molten materials and makes the molten materials extruded stably out of the feed outlet 13; meanwhile, the first screw 13 and the second screw 14 achieve the self-cleaning effect by wiping each other.

EXAMPLE 2

This example provides a co-rotating self-cleaning two-screw extruder with a gradual number of threads and through self-cleaning function, which is different from Example 1 in that the included angle θ has the value of 180°.

EXAMPLE 3

This example provides a co-rotating self-cleaning two-screw extruder with a gradual number of threads and through self-cleaning function, which is different from Example 1 in that the included angle θ has the value of 360°.

EXAMPLE 4

This example provides a co-rotating self-cleaning two-screw extruder with a gradual number of threads and through self-cleaning function, which is different from Example 1 in that in the screw assembly the single and double threaded elements both use the right hand thread.

EXAMPLE 5

This example provides a co-rotating self-cleaning two-screw extruder with a gradual number of threads and through self-cleaning function, which is different from Example 1 in that in the screw assembly only the double threaded element uses the right hand thread.

EXAMPLE 6

This example provides a co-rotating self-cleaning two-screw extruder with a gradual number of threads and through self-cleaning function, which is different from Example 1 in that in the venting section the double threaded element is substituted for the single threaded element.

EXAMPLE 7

This example provides a co-rotating self-cleaning two-screw extruder with a gradual number of threads and through self-cleaning function, which is different from Example 1 in that the screw interval is $$\frac{\sqrt{3}D}{2} \leq C < D,$$

and the first and second screws both have the structure of "a single threaded section—a single-to-triple threaded transition section—a triple threaded section—a triple-to-single threaded transition section—a single threaded section".

EXAMPLE 8

This example provides a co-rotating self-cleaning two-screw extruder with a gradual number of threads and through self-cleaning function, which is different from Example 1 in that the screw interval is 0.92388 D≤C<D, and the first and second screws both have the structure of "a single threaded section—a single-to-quadruple threaded transition section—a quadruple threaded section—a quadruple-to-single threaded transition section—a single threaded section".

The present invention can be better realized as described above. The above examples are only the preferred ones of the present invention, instead of limiting the scope of the present invention; that is, all the equivalent alterations and modifications made in accordance with the present invention are covered by the scope of protection claimed by the claims of the present invention.

What is claimed is:

1. A co-rotating self-cleaning two-screw extruder with the self-cleaning being configured to be carried out throughout an extrusion process, comprising a barrel and a screw assembly, the screw assembly being located in a barrel chamber of the barrel, characterized in that: the screw assembly includes a first screw and a second screw, which co-rotate at the same speed in engagement; the first screw includes a first single threaded element, a first transition element, a multiple threaded element, a second transition element and a second single threaded element that are connected in sequence; and the second screw correspondingly includes a first single threaded element, a third transition element, a multiple threaded element, a fourth transition element and a second single threaded element that are connected in sequence;

the first and third transition elements, paired in use, are two single-to-multiple threaded transition elements with different structure, and the second and fourth transition elements, paired in use, are two multiple-to-single threaded transition elements with different structure; and in a changing process from the first single threaded element to the multiple threaded element, a shape of a cross section of the first transition element and third transition element changes continuously, and in a changing process from the multiple threaded element to the second single threaded element, a shape of a cross section of the second transition element and fourth transition element changes continuously, wherein the materials being processed get their respective compositions mixed and are forced to move forward.

2. The co-rotating self-cleaning two-screw extruder with the self-cleaning being configured to be carried out throughout an extrusion process according to claim 1, characterized in that: the first single threaded element is the same as the second single threaded element in structure, the first transition element and the second transition element are symmetric in structure, and the third transition element and the fourth transition element are symmetric in structure.

3. The co-rotating self-cleaning two-screw extruder the self-cleaning being configured to be carried out throughout an extrusion process according to claim 1, characterized in that: the first and second screws, both tangent to the inner wall of the barrel chamber, form a flow passage together with the barrel chamber; the barrel chamber is composed of two cylindrical grooves in communication with each other, with the barrel chamber having a cross section in the shape of a horizontal "8", the first and second screws being located correspondingly in the two cylindrical grooves.

4. The co-rotating self-cleaning two-screw extruder with the self-cleaning being configured to be carried out throughout an extrusion process according to claim 1, characterized in that: the cross sections of the first and second screws are both composed of multiple arcs with different radius of curvature, and include the same number of arcs in the same axial position.

5. The co-rotating self-cleaning two-screw extruder with the self-cleaning being configured to be carried out throughout an extrusion process according to claim 4, characterized in that: the cross sections of the first and second screws are both composed of 4-8 arcs.

6. The co-rotating self-cleaning two-screw extruder with the self-cleaning being configured to be carried out throughout an extrusion process according to claim 1, characterized in that: the multiple threaded element may be a double threaded element, a triple threaded element or a quadruple threaded element.

7. The co-rotating self-cleaning two-screw extruder with the self-cleaning being configured to be carried out throughout an extrusion process according to claim 1, characterized in that: the barrel is provided with a conveying section, a melting section, an venting section and a mixing-extruding section, which are arranged in sequence in the direction of movement of the materials being processed; the conveying section is provided with a feed inlet in communication with the barrel chamber, the venting section is provided with a gas outlet in communication with the barrel chamber, and the mixing-extruding section is provided at the end with a feed outlet; the melting section is mainly provided inside with the multiple threaded element, so is the mixing-extruding section.

8. A processing method using the co-rotating self-cleaning two-screw extruder with the self-cleaning being configured to be carried out throughout an extrusion process of claim 1, characterized in that: the materials, while moving in the flow passage, are transferred by rotation of the first and second screws, and meanwhile get their respective compositions mixed based on the structure of a gradual number of threads; with the flow passage expanded, contracted and re-expanded in shape in sequence, the materials undergo the single-to-multiple threaded, multiple-to-single threaded and again single-to-multiple threaded chaotic mixing in sequence;

while the materials are transferred, the first and second screws always keep engaged, and achieve the self-cleaning effect by wiping each other.

9. The processing method using the co-rotating self-cleaning two-screw extruder with the self-cleaning being configured to be carried out throughout an extrusion process according to claim 8, characterized in that: the materials, while moving in the flow passage, have the following specific processes while they are going through various stages in the barrel:
   (1) after the materials enter the flow passage of the conveying section from the feed inlet, the first and second screws co-rotate at the same speed around the respective screw axis; the materials are transferred under the common action of the axial positive displacement conveying force of the first and second screws and the friction between the first and second screws, and meanwhile get their respective compositions mixed based on the structure of a gradual number of threads, thus eliminating the quality instability resulted from feed composition fluctuation and forcing the materials to move toward the flow passage of the melting section;
   (2) when the materials move to the flow passage of the melting section, with the continuous change of the number of threads of the first and second screws, cutting-dispersing, converging, and again cutting-dispersing, and random billowing effects are produced in the flow passage, and the first and second screws generate frictional heat at a high rotational speed that, together with the external heat of the barrel, further melts the materials; because the flow passages of the first and second screws are both characterized by the "single-to-multiple threaded—multiple-to-single threaded—again single-to-multiple threaded" chaotic mixing at the same time, and the cross section of the flow passage is "expanded, contracted and re-expanded" in shape, separation of the molten materials from the solid materials is accelerated; besides, random change is introduced into the engaging zone of the flow passages of the first and second screws, which will further enhance the chaotic mixing effect and further accelerate the melting progress of the solid materials to get the materials molten;
   (3) after the molten materials enter the flow passage of the venting section from the flow passage of the melting section, with the single thread structure of large lead used in the venting section, there is sudden expansion in the volume of the flow passage, which expands the surface area of the materials for venting gas and thus accelerates discharge of gas from the gas outlet, with the molten materials further moving to the flow passage of the mixing-extruding section under the action of the first and second screws;
   (4) the molten materials, after entering the flow passage of the mixing-extruding section, are subject to the "cutting-dispersing, converging, and again cutting-dispersing" action and also the "single-to-multiple threaded, multiple-to-single threaded, and again single-to-multiple threaded" chaotic mixing action of the first and second screws, and the first and second screws introduce the random disturbance action into the engaging zone to enhance chaotic mixing throughout the spiral groove, which mixes and plasticates the molten materials and makes the molten materials extruded stably out of the feed outlet; meanwhile, the first and second screws achieve the self-cleaning effect by wiping each other.

* * * * *